United States Patent
Serrano et al.

(10) Patent No.: US 9,594,913 B2
(45) Date of Patent: Mar. 14, 2017

(54) SYSTEM, METHOD, AND NON-TRANSITORY COMPUTER-READABLE STORAGE MEDIA FOR ANALYZING SOFTWARE APPLICATION MODULES AND PROVIDE ACTIONABLE INTELLIGENCE ON REMEDIATION EFFORTS

(71) Applicant: Wal-Mart Stores, Inc., Bentonville, AR (US)

(72) Inventors: Miguel Saiz Serrano, Mountian View, CA (US); Julie Tsai, San Francisco, CA (US); Kamal Manglani, Burlingame, CA (US); Kevin D. Walker, Campbell, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 25 days.

(21) Appl. No.: 14/607,855

(22) Filed: Jan. 28, 2015

(65) Prior Publication Data
US 2016/0217288 A1    Jul. 28, 2016

(51) Int. Cl.
*G06F 21/57*    (2013.01)
*G06F 9/44*    (2006.01)

(52) U.S. Cl.
CPC .............. *G06F 21/577* (2013.01); *G06F 9/44* (2013.01); *G06F 2221/033* (2013.01)

(58) Field of Classification Search
CPC .............. G06F 21/577; G06F 17/30312; G06F 2221/033; G06F 9/44
See application file for complete search history.

(56) References Cited

U.S. PATENT DOCUMENTS

| | | | |
|---|---|---|---|
| 7,308,712 B2 * | 12/2007 | Banzhof | G06F 21/577 726/22 |
| 7,752,609 B2 | 7/2010 | Rioux | |
| 8,201,257 B1 * | 6/2012 | Andres | G06F 21/568 726/23 |
| 8,365,155 B2 | 1/2013 | Rioux | |
| 8,499,353 B2 | 7/2013 | Lockhart et al. | |
| 8,561,176 B1 * | 10/2013 | Dalcher | G06F 11/3604 713/187 |
| 8,613,080 B2 | 12/2013 | Wysopal et al. | |
| 8,789,027 B2 | 7/2014 | Rioux | |
| 8,898,619 B2 | 11/2014 | Chaar et al. | |
| 8,898,628 B2 | 11/2014 | Raza | |
| 8,903,815 B2 | 12/2014 | Ellis et al. | |
| 8,904,478 B2 | 12/2014 | Lim | |
| 8,904,531 B1 | 12/2014 | Saklikar et al. | |

(Continued)

*Primary Examiner* — Joseph P Hirl
*Assistant Examiner* — J. Brant Murphy
(74) *Attorney, Agent, or Firm* — Howard & Howard Attorneys PLLC (57) ABSTRACT

In different embodiments of the present invention, systems, methods, and computer-readable storage media allow a user to analyze software application modules, during development of the software. The present invention may be used to analyze the software application modules, to identify vulnerabilities and to provide the user with actionable intelligence that may be used to improve the security of the software application modules. The actionable intelligence may include a list or groupings of the vulnerabilities ranked based on severability, type, and/or location.

21 Claims, 6 Drawing Sheets

(56) References Cited

U.S. PATENT DOCUMENTS

| | | | |
|---|---|---|---|
| 8,904,541 B2 | 12/2014 | Soby et al. | |
| 8,904,555 B2 | 12/2014 | Ramesh et al. | |
| 8,984,643 B1* | 3/2015 | Krisher | H04L 63/1433 726/25 |
| 2004/0260940 A1* | 12/2004 | Berg | G06F 8/43 726/25 |
| 2005/0091542 A1* | 4/2005 | Banzhof | G06F 21/577 726/4 |
| 2006/0191012 A1* | 8/2006 | Banzhof | G06F 21/577 726/25 |
| 2007/0094735 A1* | 4/2007 | Cohen | G06F 21/577 726/25 |
| 2010/0257610 A1* | 10/2010 | Hohl | G06F 21/51 726/25 |
| 2011/0179400 A1* | 7/2011 | Scholz | G06F 11/3612 717/132 |
| 2012/0185945 A1* | 7/2012 | Andres | G06F 21/568 726/25 |
| 2012/0266246 A1* | 10/2012 | Amit | G06F 21/52 726/25 |
| 2012/0266248 A1* | 10/2012 | Amit | G06F 21/52 726/25 |
| 2012/0304300 A1* | 11/2012 | LaBumbard | G06F 21/577 726/25 |
| 2013/0185798 A1* | 7/2013 | Saunders | G06F 21/56 726/24 |
| 2013/0318567 A1 | 11/2013 | Serrano et al. | |
| 2014/0067594 A1 | 3/2014 | Pavlidis et al. | |
| 2014/0067595 A1 | 3/2014 | Pavlidis et al. | |
| 2014/0089327 A1 | 3/2014 | Pavlidis et al. | |
| 2014/0143013 A1 | 5/2014 | Pavlidis et al. | |
| 2015/0339104 A1* | 11/2015 | Frenkiel | G06F 8/20 717/113 |

\* cited by examiner

| Box | Issue # | File | Line | Severity | Type | Vulnerability Correlation Index % | Vulnerability Correlation Index Issues | Code Dependency Index | CVI | Group |
|---|---|---|---|---|---|---|---|---|---|---|
| 1 | 1 | com.asda.android.utils.StreamUtils.java | 22 | High | AppDOS | 82 | 2,5 | 0 | 5 | 1,2,5 |
| 2 | 2 | com.taylor.TaylorURLConnection.java | 94 | High | AppDOS | 82 | 1,5 | 1 | 5 | 1,2,5 |
|   | 3 | Classes.More.TermsController.m | 38 | High | CrossSiteScripting | 88 | 4 | 0 | 3 | 3,4 |
|   | 4 | Classes.More.TermsController.m | 38 | High | CrossSiteScripting | 88 | 3 | 0 | 3 | 3,4 |
| 4 | 5 | com.abc.platform.iam.admin.impl.AccessPolicyAdministrationImpl.java | 203 | High | AppDOS | 80 | 1,2 | 2 | 5 | 1,2,5 |
| 5 | 6 | com.abc.platform.iam.ui.db.DbServlet.java | 187 | High | Injection.SQL | 91 | 7 | 0 | 3 | 6,7 |
|   | 7 | com.abc.platform.iam.ui.db.DbServlet.java | 223 | High | Injection.SQL | 91 | 6 | 0 | 3 | 6,7 |
| 6 | 8 | com.abc.xyz.catalogadapter.limelight.service.app.CAPerformanceImpl.java | 172 | High | AppDOS.Shutdown | 56 | 9 | 0 | 2 | - |
| 7 | 9 | com.abc.xyz.catalogadapter.limelight.service.app.CAPerformanceImpl.java | 271 | High | AppDOS.Shutdown | 56 | 8 | 0 | 2 | - |
|   | 10 | com.abc.services.termservicesingestion.biz.impl.service.FileSystemServiceImpl.java | 131 | High | AppDOS | 34 | 1,2,5 | 0 | 2 | 1,2,5 |
| 8 | 11 | com.walmart.services.termservicesingestion.biz.impl.service.HDFSServiceImpl.java | 260 | High | AppDOS | 45 | 1,3,5 | 0 | 2 | 1,3,5 |

Fig. 6

SYSTEM, METHOD, AND NON-TRANSITORY COMPUTER-READABLE STORAGE MEDIA FOR ANALYZING SOFTWARE APPLICATION MODULES AND PROVIDE ACTIONABLE INTELLIGENCE ON REMEDIATION EFFORTS

FIELD OF THE DISCLOSURE

The present invention relates to the development of complex software application, and more particularly, to systems, methods, and computer-readable storage media that analyzes software modules, identifies vulnerabilities and provides actionable intelligence that may be used to improve the security of the software application modules.

BACKGROUND

Software applications are growing in size and complexity increasing the scope and difficulty of detecting undesired defects. The problem may be particularly acute with large commercial software development because the development team may be under constant pressure to deliver new code features and changes, sometimes multiple times a day.

With the advent of Test-Driven Development, some of the defects may be caught early. However, existing tests are focused on testing functional requirements as opposed to testing for robustness against security defects and attacks. This may expose an organizations to security vulnerabilities that could result in very serious risk, as well as compliance issues.

Static application security testing (SAST) is a scalable approach that reviews the code from the moment the developer writes the code in the Integrated Development Environment (IDE) or commits it to the CI (continuous integration) tool, providing early feedback that is key to reducing code's vulnerabilities early in the software lifecycle.

However, current SAST solutions focus simply on reporting code issues. Current SAST solutions do not provide intelligent recommendations about prioritizing remediation efforts.

The present invention is aimed at one or more of the problems identified above.

SUMMARY OF THE INVENTION

In different embodiments of the present invention, systems, methods, and computer-readable storage media allow a user to analyze software application modules, during development of the software. The present invention may be used to analyze the software application modules, to identify vulnerabilities and to provide the user with actionable intelligence that may be used to improve the security of the software application modules. The actionable intelligence may include a list or groupings of the vulnerabilities ranked based on severability, type, and/or location (see below).

Similar to improving functional needs of an application by automating tests even before writing the code; in one aspect of the present invention, security threats may be addressed head-on at the same time the code is being developed. This is the only way security can keep up with—or get ahead—of the threats to the software. This helps software developers quickly get feedback on vulnerabilities and fix the code while the software application is being developed rather than at the end of the development cycle.

In another aspect of the present invention, the invention will focus on providing a process and tool that will intelligently learn how to optimize prioritization efforts in order to secure applications code in the most efficient way. The invention implement a Code Vulnerability Index (CVI) that provides a high level indicator to the developers in a very visible manner. The invention also provides remediation suggestion if one is known that can be implemented to improve the CVI of the application or product. CVIs can be plotted over a period of time to indicate overall improvement of security posture of a set of applications or infrastructure as a whole system. On notification of a poor CVI, the invention will prompt developers to look at the recommended remediation actions; upon implementation, they will notice an instantaneous improvement in CVI.

In one embodiment of the present invention, a system for analyzing a software application and for providing actionable intelligence on remediation efforts is provided. The system includes a memory unit, a vulnerability identification unit, a vulnerability correlation index generation unit, a code dependency index generation unit, and a prioritization list generation unit. The memory unit is configured to store the software application. The software application includes a plurality of software application modules arranged in a predetermined flow structure. The vulnerability identification unit is coupled to the memory unit and is configured to identify vulnerabilities within the software application modules and to assign a severity to each identified vulnerability. The vulnerability correlation index generation unit is coupled to the memory unit and the vulnerability identification unit and is configured to analyze the identified vulnerabilities and to assign a recommended vulnerability remediation effort to each identified vulnerability, to establish one or more groups of vulnerabilities as a function of the assigned recommended vulnerability remediation effort and to establish a vulnerability correlation index associated with each group of vulnerabilities. The code dependency index generation unit is coupled to the memory unit, the vulnerability identification unit, and the vulnerability correlation index unit and is configured to analyze each group of vulnerabilities and, for each group of vulnerabilities, to identify a point within the predetermined flow structure common to vulnerabilities having the same vulnerability remediation type within the same group of vulnerabilities. The prioritization list generation unit is coupled to the memory unit, the vulnerability identification unit, the vulnerability correlation index unit, and the code dependency index generation unit and is configured to generate a prioritized list of remediation efforts aimed at mitigating the identified vulnerabilities as a function of the identified vulnerabilities and the severity assigned to each identified vulnerability, the vulnerability correlation index associated with each group of vulnerabilities, and the points common to vulnerabilities having the same vulnerability remediation type within the same group of vulnerabilities. The prioritization list generation unit is further configured to store the prioritized list of remediation efforts within the memory unit.

In another embodiment of the present invention, a method for analyzing a software application and for providing actionable intelligence on remediation efforts is provided. The method includes the steps of storing the software application on a memory unit, the software application including a plurality of software application modules arranged in a predetermined flow structure and identifying vulnerabilities within the software application modules, using a vulnerability identification unit coupled to the memory unit, and assigning a severity to each identified vulnerability. The method also includes the steps of analyzing, using a vulnerability correlation index generation unit coupled to the memory unit and the vulnerability identification unit, the identified vulnerabilities and assigning a recommended vulnerability remediation effort to each identified vulnerability, establishing one or more groups of vulnerabilities as a function of the assigned recommended vulnerability remediation effort and establishing a vulnerability correlation index associated with each group of vulnerabilities. The method includes the steps of analyzing, using a code dependency index generation unit coupled to the memory unit, the vulnerability identification unit, and the vulnerability correlation index unit, each group of vulnerabilities and, for each group of vulnerabilities, identifying a point within the predetermined flow structure common to vulnerabilities having the same vulnerability remediation type within the same group of vulnerabilities. The method further includes the steps of generating, using a prioritization list generation unit coupled to the memory unit, the vulnerability identification unit, the vulnerability correlation index unit, and the code dependency index generation unit, a prioritized list of remediation efforts aimed at mitigating the identified vulnerabilities as a function of the identified vulnerabilities and the severity assigned to each identified vulnerability, the vulnerability correlation index associated with each group of vulnerabilities, and the points common to vulnerabilities having the same vulnerability remediation type within the same group of vulnerabilities.

In still another embodiment of the present invention, one or more non-transitory computer-readable storage media, having computer-executable instructions embodied thereon, wherein when executed by at least one processor, the computer-executable instructions cause the processor to operate as a memory unit, a vulnerability identification unit, a vulnerability correlation index generation unit, a code dependency index generation unit, and a prioritization list generation unit. The memory unit is configured to store the software application. The software application includes a plurality of software application modules arranged in a predetermined flow structure. The vulnerability identification unit is coupled to the memory unit and is configured to identify vulnerabilities within the software application modules and to assign a severity to each identified vulnerability. The vulnerability correlation index generation unit is coupled to the memory unit and the vulnerability identification unit and is configured to analyze the identified vulnerabilities and to assign a recommended vulnerability remediation effort to each identified vulnerability, to establish one or more groups of vulnerabilities as a function of the assigned recommended vulnerability remediation effort and to establish a vulnerability correlation index associated with each group of vulnerabilities. The code dependency index generation unit is coupled to the memory unit, the vulnerability identification unit, and the vulnerability correlation index unit and is configured to analyze each group of vulnerabilities and, for each group of vulnerabilities, to identify a point within the predetermined flow structure common to vulnerabilities having the same vulnerability remediation type within the same group of vulnerabilities. The prioritization list generation unit is coupled to the memory unit, the vulnerability identification unit, the vulnerability correlation index unit, and the code dependency index generation unit and is configured to generate a prioritized list of remediation efforts aimed at mitigating the identified vulnerabilities as a function of the identified vulnerabilities and the severity assigned to each identified vulnerability, the vulnerability correlation index associated with each group of vulnerabilities, and the points common to vulnerabilities having the same vulnerability remediation type within the same group of vulnerabilities. The prioritization list generation unit is further configured to store the prioritized list of remediation efforts within the memory unit.

BRIEF DESCRIPTION OF THE FIGURES

Other advantages of the present disclosure will be readily appreciated, as the same becomes better understood by reference to the following detailed description when considered in connection with the accompanying drawings wherein.

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

The disclosure particularly describes a software application may be analyzed during development, to detect and provide recommendations, including recommended prioritized remediation efforts that may be used by a user/programmer to efficiently correct or fix detected vulnerabilities. The present invention may be applied or used in, e.g., integrated into, an integrated developed environment (IDE) or a Continuous Integration Tool. The software application may be comprised of a plurality of software application modules. The software application modules may be any combination of different software applications (or sub-applications), functions, procedures, software objects, variables, etc. . . . The software application modules may be written in any software language and need not be written in the same language as other software application modules. The software application modules may be located on the same computer (during development and/or in use) or the software application modules may be located on different computers within a computer network (during development and/or in use). During development, the software application, i.e., the software application modules, may be located on a network test bed that mirrors or simulates the network on which the software application will operate in use.

With reference to the FIGS. and in operation, the present invention provides a system 10, methods and computer product media that facilitates analyzing a software application and provides actionable intelligence, i.e., recommendations, on remediation efforts. In particular, the present invention may analyze the software application and identify any vulnerabilities. Historical vulnerabilities and recommended remediation efforts may be stored in a knowledge base (see below). The identified vulnerabilities, as well as the software application, e.g., the structure or the software application, may be analyzed in an effort to group and/or prioritize the vulnerabilities such that remediation efforts may be prioritized (see below).

Figure 1:
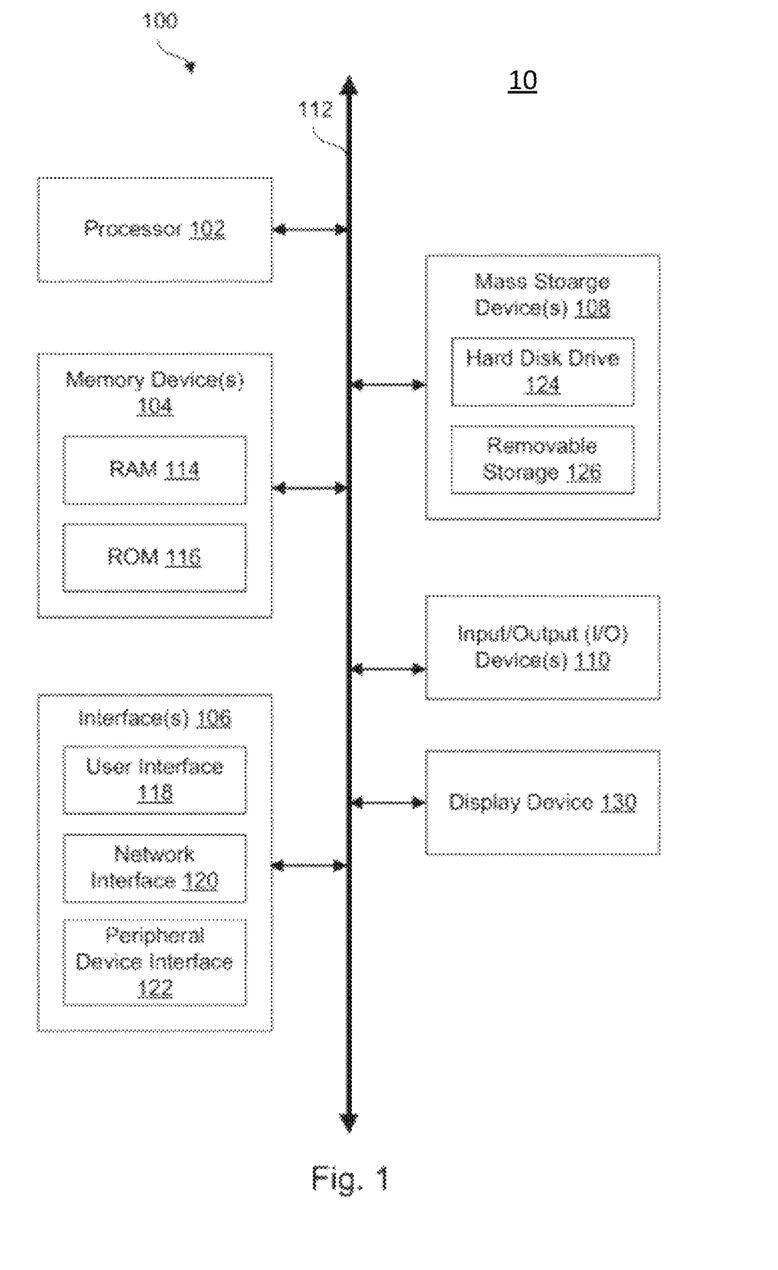
FIG. 1 is a schematic illustrating various aspects of a system, according to the present disclosure.

FIG. 1 is a block diagram illustrating an example computing device 100. Computing device 100 may be used to perform various procedures, such as those discussed herein. Computing device 100 can function as a server, a client, or any other computing entity. Computing device 100 can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like. In particular, as discussed above the present invention may be embodied in a software tool that is integrated into, or a part of, an Integrated Development Environment (IDE) or Continuous Integration Tool (CIT). The computing device 100 may provide access to the IDE or CIT and may be coupled to a computer network on which the software application is stored.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
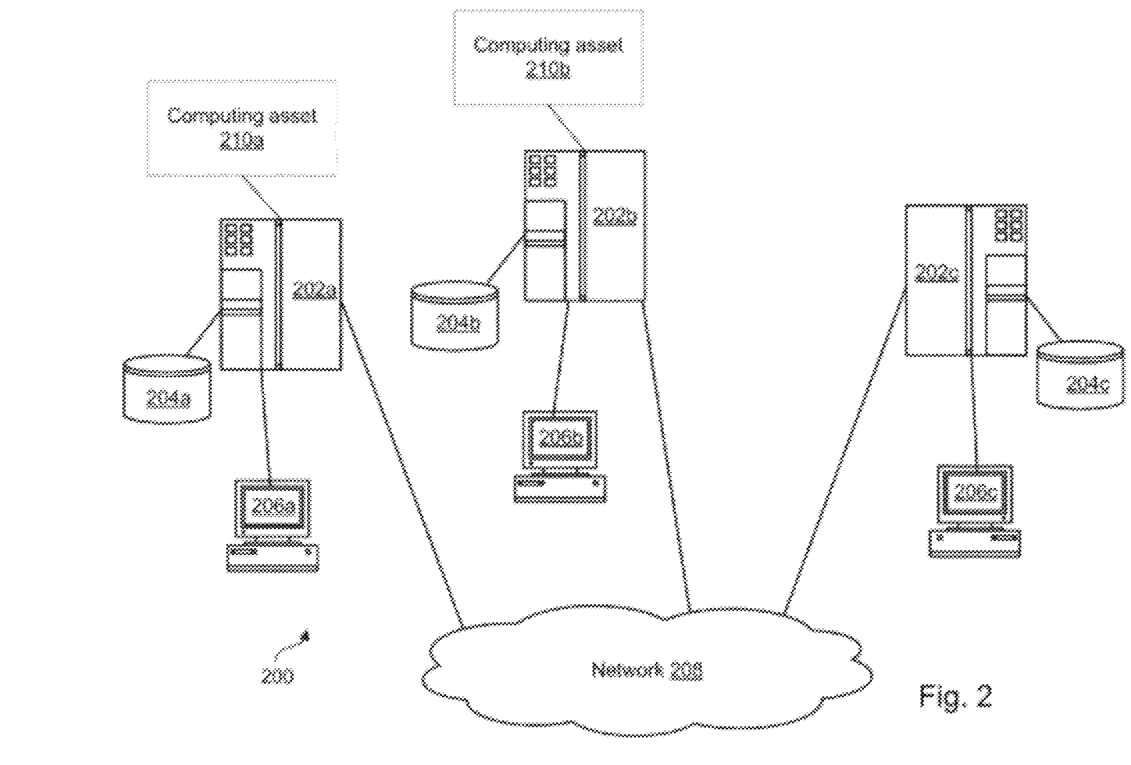
FIG. 2 is a schematic illustrating example components of computer network, according to an embodiment of the present invention.

FIG. 2 illustrates a networked environment 200 in which methods described herein may be used. The environment 200 may include a plurality of computer servers 202a-202c. The servers 202a-202c may be geographically separated, such as in different cities, countries, or continents. The methods disclosed herein may also advantageously be used with computer servers 202a-202c that are located within the same facility. The computer servers 202a-202c may be operably coupled to one or more databases 204a-204c for storing operational and/or executable data. A user wishing to access data and functionality of the computer servers 202a-202c and databases 204a-204c may do so by means of terminals 206a-206c operably coupled thereto. The computer servers 202a-202c and/or terminals 206a-206c may have some or all of the attributes of the computing device 100 of FIG. 1. The terminals 206a-206c may be a /workstation, tablet computer, smart phone, or any other computing device. The servers 202a-202c may be operably connected to one another by a network 208. The network 208 may include a local area network (LAN), wide area network (WAN), the Internet, or a combination of any of these.

The servers 202a-202b may be used to manage and/or monitor activity at one or more computing assets 210a-210b. The computing assets 210a-210b may include a number of servers, workstations, tablet computers, smart phones, and the like. The computing assets 210a-210b may also include electronically controlled physical systems, i.e., door locks, climate control systems, alarm systems, and the like. The physical systems of the computing assets 210a-210b may also be controlled and/or monitored by a server, such as a server 202a-202c.

A server 202c may operate as a global server 202c operable to monitor and report on security data gathered from the servers 202a-202b, operating as asset server 202a-202b, and the corresponding computing assets 210a-210b. Alternatively, the global server 202c may communicate directly with computing resources of the computing assets 210a-210b such that asset servers 202a-202b may be omitted or bypassed.

Figure 3:
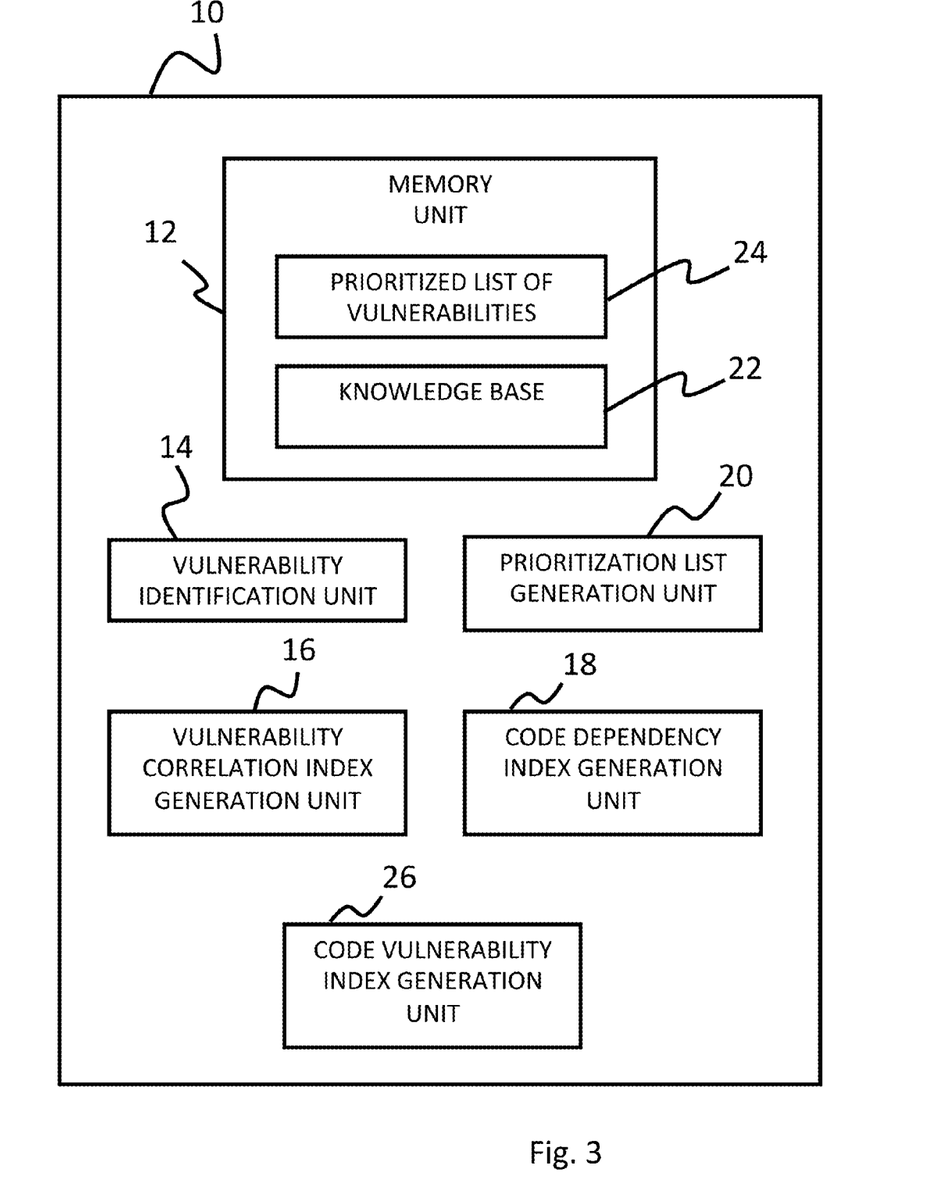
FIG. 3 is a functional schematic of the present invention, according to an embodiment of the present invention.

With reference to FIG. 3, the system 10 includes a memory unit 12, a vulnerability identification unit 14, a vulnerability identification unit 16, a code dependency index generation unit 18, and a prioritization list generation unit 20. As discussed more fully below, the system 10 focuses on providing a process and tool that will intelligently learn how to optimize prioritization efforts in order to secure application code in the most efficient way, The invention implements a code vulnerability index (CVI) that provides a high level indicator to the developer(s) in a visible manner. The system 10 may also provide one or more remediation suggestions if one is known that can be implemented to improve the CVI of the software application. Furthermore, the CVI may be plotted over a period of time to indicate overall improvement of the security posture of a set of software applications as a whole system.

In one embodiment, when the system 10 detects a poor, i.e., high CVI, the system 10 may prompt the developed to look at the recommended remediation efforts or actions. Once the remediation efforts have been implemented the user should see a significant improvement in the CVI.

In one embodiment of the present invention, the CVI of a software application will be based on a scale of 1 to 10. For example, in one embodiment, the CVI has a scale of (from higher to lower risk):

CVI 7-10 implies a need for more than 5 remediation corrections of significant (or high) vulnerabilities, CVI 4-6 implies a need of 3-5 remediation corrections of significant vulnerabilities, and CVI 1-3 implies the need for under 3 remediation corrections of significant vulnerabilities.

The CVI score may be used to communicate a risk level associated with the software application to the developer(s) within the context of the volume and significance of the vulnerabilities in terms of exploitability.

In one embodiment of the present invention, the memory unit 12 includes one or more of the memory devices 104 and/or mass storage devices 108 of one or more of the computing devices 100. The one or more computing devices 100 may be a user computing device 100 through which a user accesses the IDE or CIT. The present invention may include software application(s) that implement the IDE or CIT, in addition to the software application(s) that, in part (see below), implement the vulnerability identification unit 14, the vulnerability identification unit 16, the code dependency index generation unit 18, and the prioritization list generation unit 20. The units 12, 14, 16, 18, 20 that comprise the invention are composed of a combination of hardware and software, i.e., the hardware as modified by the applicable software applications. For example, in an embodiment in which the software being analyzed and the IDE or CIT, at least for development and testing purposes, reside on a single computing device 100, the units 12, 14, 16, 18, 20 of the present invention are comprised of one of more of the components 102, 104, 106, 108, 110, 112, 130, of the computing device 100, as modified by one or more software applications. In an embodiment in which the software being analyzed and the IDE or CIT reside across on computer network, the units 12, 14, 16, 18, 20 of the present invention are comprised of one of more of the components 102, 104, 106, 108, 110, 112, 130 of one or more of the computing devices (whether computer/network server 202A, 202b, 202C, computing asset 210a, 20b, or terminal 20ga, 206b, 206c), as modified by one or more software applications.

In one embodiment, the memory unit 12 is configured to store the software application, the software application including a plurality of software application modules arranged in a predetermined structure. Further, it should be noted that the software has, in operation, a dynamic flow structure that is dependent not only on the predetermined structure of the software modules, but is also dependent upon the data (or sample data) upon which the software is running. The software application modules may be pre-defined segments of code that are defined to perform a predetermined function. The software application modules may be defined in any one of a different manners, including functions, procedures, objects, applications, or sub-applications.

The vulnerability identification unit 14 is coupled to the memory unit 12 and is configured to identify vulnerabilities within the software application modules and to assign a severity to each identified vulnerability. In one embodiment of the present invention, vulnerabilities may be defined as errors, bugs, etc. . . . , within the code that provide unintended functionality that places the security of the network at risk. For example, a vulnerability could allow unintended access to customer data in a commercial network. Vulnerabilities may be assigned a severity to each identified vulnerability. In one embodiment, each identified vulnerability is assigned one of three predefined severities: low, medium, or high. However it should be noted that any number of severity levels may be used.

The vulnerability correlation index generation unit 16 is coupled to the memory unit 12 and the vulnerability identification unit 14. The vulnerability correlation index generation unit 16 may be configured to:

analyze the identified vulnerabilities and to assign a recommended vulnerability remediation effort to each identified vulnerability, and establish one or more groups of vulnerabilities as a function of the assigned recommended vulnerability remediation effort and to establish a vulnerability correlation index (CVI) associated with each group of vulnerabilities.

In one embodiment of the present invention, the groups of vulnerabilities may be further established as a function of similar patterns in the software application modules. For example, a group may be established based on similar patterns in an associated root cause and/or a suggested or recommended remediation action.

In one embodiment, the memory unit 12 may include a historical database or knowledge base 24 of known vulnerabilities and known associated remedial actions. The vulnerability correlation index generation unit may assign the recommended vulnerability remediation effort to each identified vulnerability as a function of the historical database 24 of known vulnerabilities.

The vulnerability correlation index generation unit may be further configured to compare the software application modules associated with the vulnerabilities in each group of vulnerabilities. The vulnerability correlation index may then be established as a function of the comparison between the software application modules associated with the vulnerabilities in each respective group of vulnerabilities. In one embodiment, a set of standard or predefined parameters with the software application modules are analyzed in order to establish the CVI. In one aspect, the CVI is a "proximity score" that is used to establish whether to consider the vulnerabilities within a group and/or the recommendation remediation efforts are the same or close enough to be addressed at jointly. In one embodiment, the CVI is percentage.

In one embodiment, the vulnerability correlation index generation unit further establishes each group of vulnerabilities from vulnerabilities having a common recommended vulnerability remediation effort if the associated vulnerability correlation index is above a predetermined threshold. In other words, once a (potential) group of vulnerabilities is established based on the established recommended remediation efforts, the group is confirmed if the CVI is above a predetermined threshold value. In one embodiment, the predetermined threshold value is 80%, although other suitable percentages may be used.

The code dependency index generation unit 18 is adapted to look for dependencies within the code that could be used to group mitigation or remediation efforts. In other words, the code dependency index generation unit 18 attempts to group issues together based on the code structure so that a patch or correction could be applied to a common node. The code dependency index generation unit 18 is coupled to the memory unit 12, the vulnerability identification unit 14, and the vulnerability correlation index unit 16. The code dependency index generation unit 18 is configured to analyze each group of vulnerabilities and, for each group of vulnerabilities, to identify a point or code dependency index (CDI) within the predetermined flow structure common to vulnerabilities having the same vulnerability remediation type within the same group of vulnerabilities. In one embodiment, the code dependency index may identify a software application module or node within the structure of the software application that is common to the modules containing a vulnerability within the same group. Thus, a remediation effort may be able to be applied to the common modules or node to address the vulnerabilities within the same group of vulnerabilities. In one embodiment the CDI is found by analyzing the program modules containing vulnerabilities to find the level of dependency among the code modules. The analysis may include an evaluation of specific characteristics of the software module, e.g., method connections, properties inheritance and any shared similarities and shared information and structures.

Figure 6:
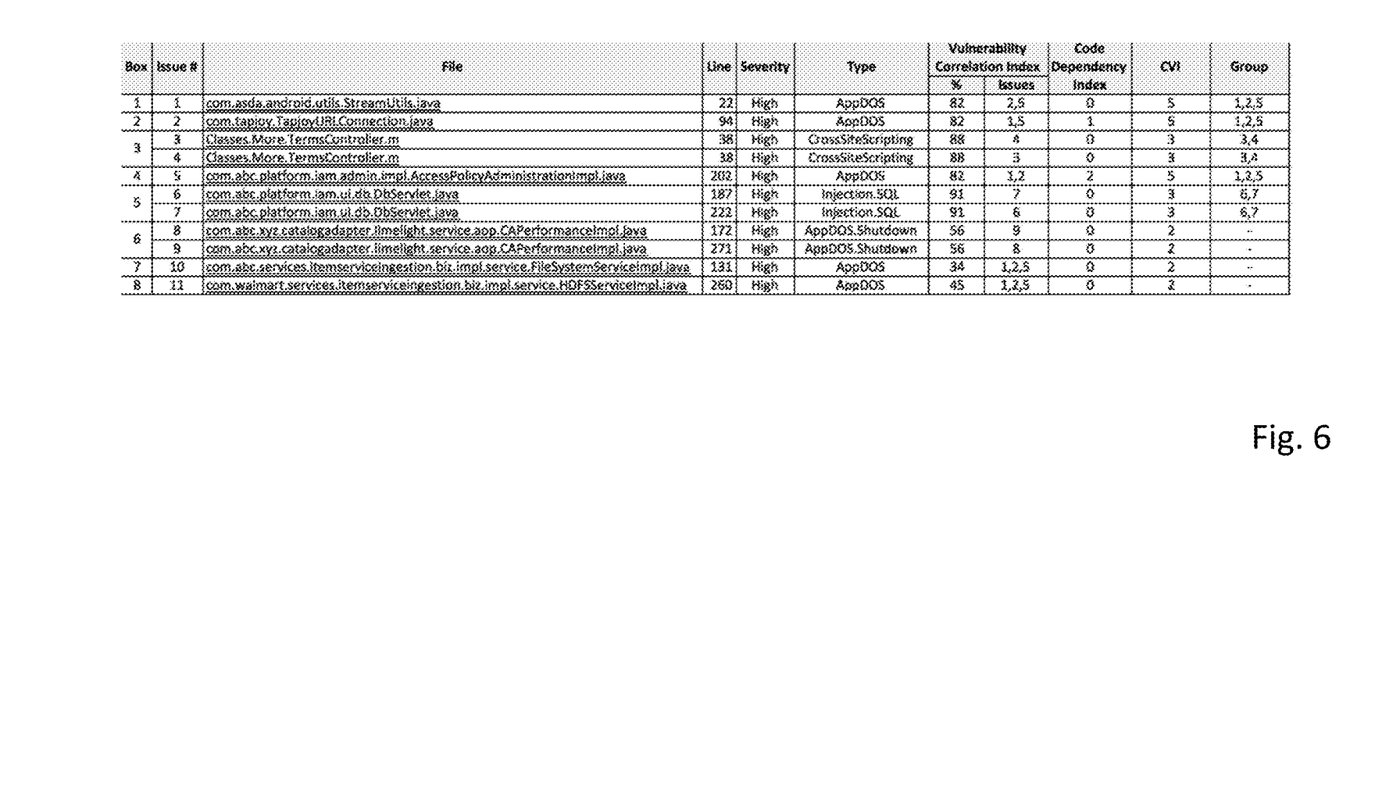
FIG. 6 is an illustration of an exemplary screenshot from the system of FIG. 1, according to an embodiment of the present invention.

The prioritization list generation unit 20 is coupled to the memory unit 12, the vulnerability identification unit 14, the vulnerability correlation index unit 16, and the code dependency index generation unit 18. In one embodiment, the prioritization list generation unit 20 is configured to generate a prioritized list of remediation efforts aimed at mitigating the identified vulnerabilities as a function of the identified vulnerabilities and the severity assigned to each identified vulnerability, the vulnerability correlation index associated with each group of vulnerabilities, and the points common to vulnerabilities having the same vulnerability remediation type within the same group of vulnerabilities, the prioritization list generation unit further configured to store the prioritized list of remediation efforts within the memory unit. An exemplary prioritization list is shown in FIG. 6.

In one embodiment, the system 10 further includes a code vulnerability index generating unit 26. The code vulnerability index generating unit 26 is coupled to the memory unit 12, the vulnerability identification unit 14, the vulnerability correlation index generation unit 16, and the code dependency index generation unit 16 and is configured to establish a code vulnerability index associated with each software application module, as a function of the vulnerabilities, the vulnerability correlation index and the code dependency index.

Figure 4:
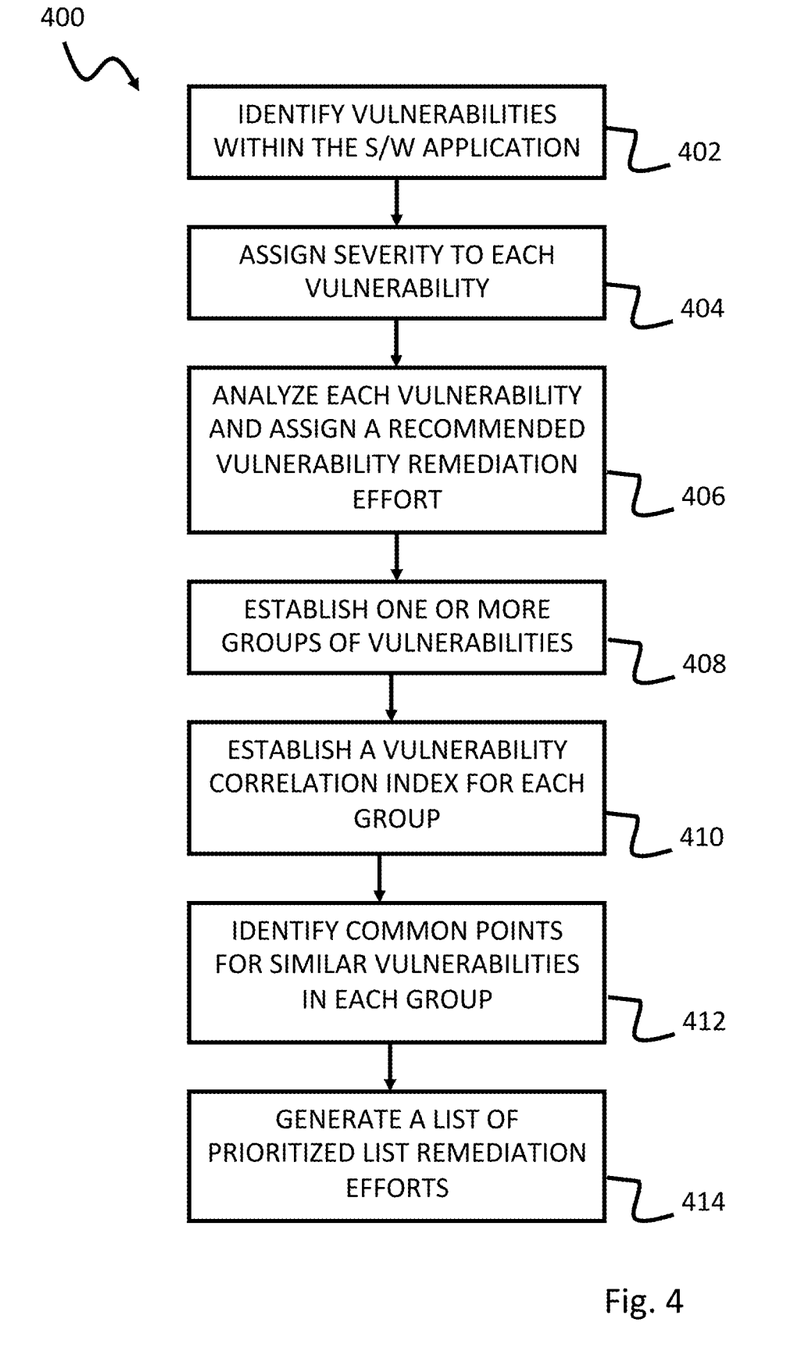
FIG. 4 is a flowchart of a method that may be used with the system shown in FIG. 1, according to an embodiment of the present invention.

FIG. 4 is a flowchart of a method 400 that may be used with the system 10 for analyzing a software application and for providing actionable intelligence on remediation efforts. The methods include a plurality of steps. Each method step may be performed independently of, or in combination with, other method steps. Portions of the methods may be performed by any one of, or any combination of, the components of the system 10.

In a first step 402, vulnerabilities within the software application modules are identified Step 402 may be performed by the vulnerability identification unit 14. In a second step 404, each vulnerability is assigned a severity, e.g., one of low, medium, and high.

In a third step 406, the identified vulnerabilities are analyzed and assigned a recommended vulnerability remediation effort. One or more groups of vulnerabilities may be established in a fourth step 408 as a function of the assigned recommended vulnerability remediation effort. In a fifth step 410 a vulnerability correlation index associated with each group of vulnerabilities is established.

Each group of vulnerabilities is analyzed in a sixth step 412 and a point within the predetermined flow structure common to vulnerabilities having the same vulnerability remediation type within the same group of vulnerabilities is identified. In a seventh step 414, a prioritized list of remediation efforts aimed at mitigating the identified vulnerabilities is generated as a function of the identified vulnerabilities and the severity assigned to each identified vulnerability, the vulnerability correlation index associated with each group of vulnerabilities, and the points common to vulnerabilities having the same vulnerability remediation type within the same group of vulnerabilities. The prioritized list of remediation efforts may be stored within the memory unit 12.

Figure 5:
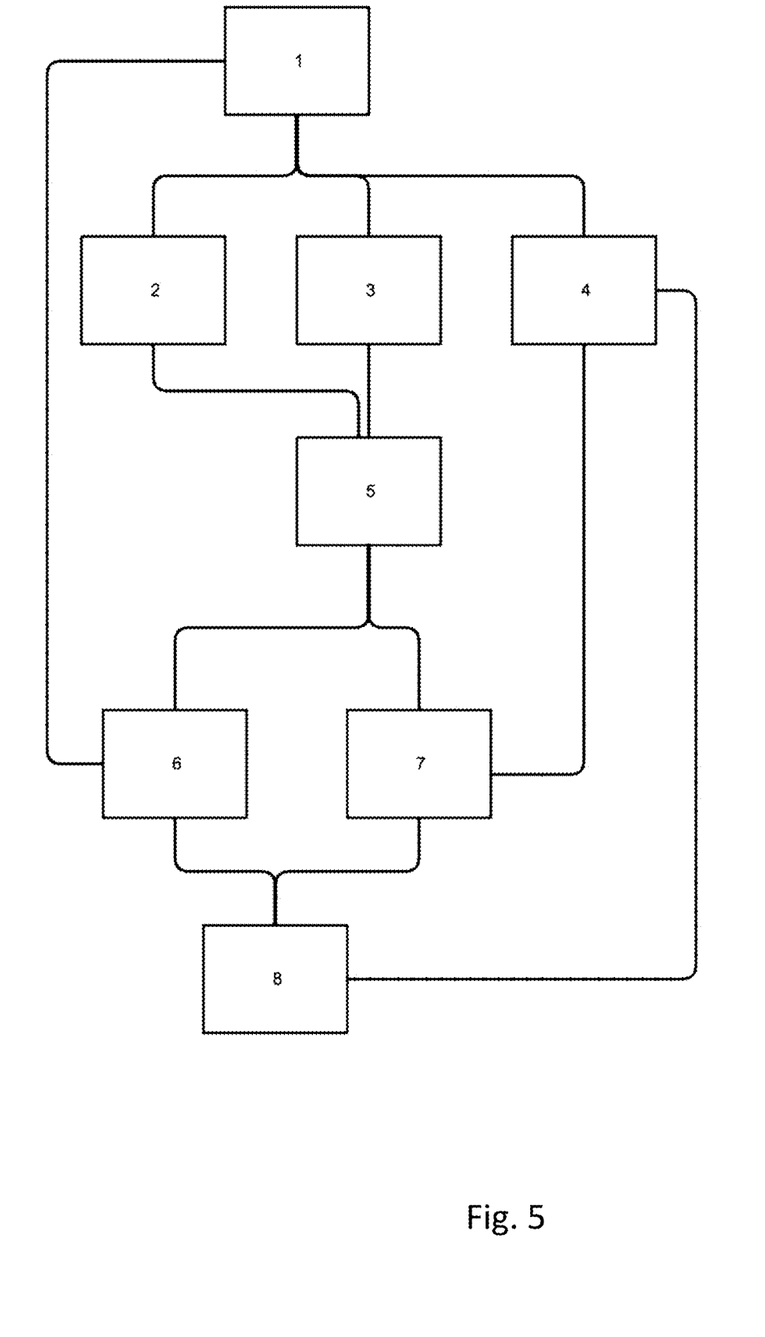
FIG. 5 is an exemplary execution flow diagram of a software application that is being analyzed using the system and/or method of FIGS. 1 and 4, according to an embodiment of the present invention.

With reference to FIGS. 5 and 6, the present invention will now be described in an exemplary embodiment. FIG. 5 illustrates an exemplary execution flow diagram of a sample software application. The sample software application includes 8 software application modules (labeled "1" through "8"). An example priority list is shown in FIG. 6. The system 10 and method 400 inspects/analyzes the software application report the issues/defects, i.e., vulnerabilities, reporting information in a plurality of columns e.g., "File", "Line", "Severity", "Type".

The "Vulnerability correlation index" column will be generated as follows, For each of the issues of the same type, the system 10 will analyze the structure of the code in which the issue was found and compare it with all the other issues of the same type. The structure comparison will provide a similarity value (a percentage) that will conform the correlation index (also a percentage) among the issues of the same type.

In this embodiment, all of the issues with a correlation >80% will be grouped together so that a common patch may be applied to the grouped vulnerabilities. This will create higher efficiency by giving the developer(s) a common path that can be reused for several issues, avoiding treating issues one by one (see column "Group")

"Code dependency index": for each of the issues of the same type, the system 10 will also create a dependency tree up to the root level of the code to identify if there is a path that contains more than one issue in any of the branches. If the system 10 finds a branch with more than one issue it will group all the issues found and provide the dependency tree and a point in the code (the closest to the first issue in the chain) where it recommends to implement the patch. This will create higher efficiency by giving developers a point in the code that can fix several issues identified in dependent code, hence avoiding fixing all the issues one by one.

Example: the software is run using sample data and in the resulting dependency tree, the system 10 finds that a branch starting in box 5 has two issues of same type (A):
  Issue 001 (type A) found in module 6,
  Issue 002 (type A) found in module 7.
The software modules with issues 001 and 002 is invoked from box 5. Thus, the system 10 will suggest implementing a patch in box 5 to address issues 001 and 002.

"Vulnerability Correlation Index": the system 10 will store in a knowledge base all previous fixed issues and patches implemented. Once all of the issues with a correlation >80% (can be adjusted) have been grouped together the system 10 will also look into the fixed issues and if the VCI with fixed issues is >80% (can be adjusted) then the tool will show a recommended action to address the issue, saving developers time to create a new patch.

For "Code Dependency Index": the system 10 will store in a knowledge base all previous fixed issues and patches implemented. If the system 10 identifies that there was an issue of the same type implemented in that branch it will suggest using same patch to address the issue. For example:
  New issue 003 (type A) found in box 8
  Code with issue 3 invoked from box 7
The tool will suggest leveraging a patch in box 5 to be applied for issues 001 and 002 to address issue 003.

In one aspect, the CVI will be assigned based on the size of the groups formed based on "vulnerability correlation index" or by the number of issues in a branch when "code dependency index". In one embodiment, the CVI may be calculated as follows:
  <3 issues, then CVI will be:
  CVI=1 (1M+0H)
  CVI=2 (2M+0H; [0,1]M+1H)
  CVI=3 (0M+2H)
  3-5 issues, then CVI will be:
  CVI=4 (5M+0H; 4M+[0,1]H; 3M+[0,1,2]H; 2M+[1,2]H)
  CVI=5 ([0,1,2]M+3H)
  CVI=6 (1M+4H; 0M+5H)

>5 issues, then CVI will be:

CVI=7 (6M+0H; 5M+1H; 4M+2H; 3M+3H; 2M+4H; 1M+5H)

CVI=8 (6H, any M)

CVI=9 (7H, any M)

CVI=10 (>7H, any M),

Where H is the number of high severity vulnerabilities, and M is the number of medium severity vulnerabilities.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A computer implemented method for analyzing a software application and for providing actionable intelligence on remediation efforts, including the steps of:

storing the software application on a memory device by a processor, the software application including a plurality of software application modules arranged in a predetermined flow structure, each software application module including predefined segments of code;

accessing each of the plurality of software application modules and identifying vulnerabilities within each predefined segments of code associated with the corresponding software application modules, using the processor programmed to operate as a vulnerability identification unit coupled to the memory device, and assigning a severity to each identified vulnerability;

analyzing, using the processor programmed to operate as a vulnerability correlation index generation unit coupled to the memory device and the vulnerability identification unit, the identified vulnerabilities and assigning a recommended vulnerability remediation effort to each identified vulnerability, establishing one or more groups of software application modules as a function of the assigned recommended vulnerability remediation efforts, and generating a vulnerability correlation index (VCI) value associated with each group of software application modules including comparing the predefined segments of code of each software application module included in a corresponding group;

selecting, using the processor programmed to operate as a code dependency index generation unit coupled to the memory device, the vulnerability identification unit, and the vulnerability correlation index unit, each group of software application modules having a predefined VCI value and analyzing each selected group of software application modules to identifying a code dependency index including a point within the predetermined flow structure common to each software application module within the same group of software application modules;

establishing, using the processor programmed to operate as a code vulnerability index generating unit coupled to the memory device, the vulnerability identification unit, the vulnerability correlation index generation unit, and the code dependency index generation unit, a code vulnerability index associated with each group of software application modules as a function of the vulnerabilities, the vulnerability correlation index and the code dependency index; and, generating, using the processor programmed to operate as a prioritization list generation unit coupled to the memory device, the vulnerability identification unit, the vulnerability correlation index unit, and the code dependency index generation unit, a prioritized list of remediation efforts aimed at mitigating the identified vulnerabilities, the prioritized list of remediation efforts including the identified vulnerabilities and the severity assigned to each identified vulnerability, the vulnerability correlation index associated with each group of vulnerabilities, and the corresponding code dependency indexes and storing the prioritized list of remediation efforts within the memory device.

2. A method, as set forth in claim 1, wherein the severity of each identified vulnerability is one of low, medium, and high.

3. A method, as set forth in claim 1, wherein the groups of vulnerabilities are further established as a function of similar patterns in the software application modules, wherein the similar patterns may be one of an associated root cause and a remediation action.

4. A method, as set forth in claim 3, wherein the memory device includes a historical database of known vulnerabilities and known associated remedial actions, wherein the recommended vulnerability remediation effort is assigned to each identified vulnerability as a function of the historical database of known vulnerabilities.

5. A method, as set forth in claim 4, further including the step of comparing the software application modules associated with the vulnerabilities in each group of vulnerabilities, wherein the vulnerability correlation index is established as a function of the comparison between the software application modules associated with the vulnerabilities in each respective group of vulnerabilities.

6. A method, as set forth in claim 5, wherein each group of software application modules is established from vulnerabilities having a common recommended vulnerability remediation effort is established if the associated vulnerability correlation index is above a predetermined threshold.

7. A method, as set forth in claim 1, further including the step of identifying lines of code having the identified vulnerabilities, and storing the identified lines of code in the prioritized list of remediation efforts.

8. A system for analyzing a software application and for providing actionable intelligence on remediation efforts, comprising:
a memory device configured to store the software application, the software application including a plurality of software application modules arranged in a predetermined flow structure, each software application module including predefined segments of code; and
one or more processors coupled to the memory device, the one or more processors programmed to operate as:
a vulnerability identification unit coupled to the memory device and being configured to access each of the plurality of software application modules and identify vulnerabilities within each predefined segments of code associated with the corresponding software application modules and to assign a severity to each identified vulnerability;
a vulnerability correlation index generation unit coupled to the memory device and the vulnerability identification unit and being configured to analyze the identified vulnerabilities and to assign a recommended vulnerability remediation effort to each identified vulnerability, to establish one or more groups of software application modules as a function of the assigned recommended vulnerability remediation efforts, and to generate a vulnerability correlation index (VCI) value associated with each group of software application modules including comparing the predefined segments of code of each software application module included in a corresponding group;
a code dependency index generation unit coupled to the memory device, the vulnerability identification unit, and the vulnerability correlation index unit and being configured to select each group of software application modules having a predefined VCI value and analyze each selected group of software application modules to identify a code dependency index including a point within the predetermined flow structure common to each software application module within the same group of software application modules;
a code vulnerability index generating unit coupled to the memory device, the vulnerability identification unit, the vulnerability correlation index generation unit, and the code dependency index generation unit and being configured to establish a code vulnerability index associated with each group of software application modules as a function of the vulnerabilities, the vulnerability correlation index and the code dependency index; and,
a prioritization list generation unit coupled to the memory device, the vulnerability identification unit, the vulnerability correlation index unit, and the code dependency index generation unit, the prioritization list generation unit configured to generate a prioritized list of remediation efforts aimed at mitigating the identified vulnerabilities, the prioritized list of remediation efforts including the identified vulnerabilities and the severity assigned to each identified vulnerability, the vulnerability correlation index associated with each group of vulnerabilities, and the corresponding code dependency indexes, the prioritization list generation unit further configured to store the prioritized list of remediation efforts within the memory device.

9. A system, as set forth in claim 8, wherein the severity of each identified vulnerability is one of low, medium, and high.

10. A system, as set forth in claim 8, wherein the groups of vulnerabilities are further established as a function of similar patterns in the software application modules, wherein the similar patterns may be one of an associated root cause and a remediation action.

11. A system, as set forth in claim 10, wherein the memory device includes a historical database of known vulnerabilities and known associated remedial actions, wherein the vulnerability correlation index generation unit assigns the recommended vulnerability remediation effort to each identified vulnerability as a function of the historical database of known vulnerabilities.

12. A system, as set forth in claim 11, wherein the vulnerability correlation index generation unit is further configured to compare the software application modules associated with the vulnerabilities in each group of vulnerabilities, wherein the vulnerability correlation index is established as a function of the comparison between the software application modules associated with the vulnerabilities in each respective group of vulnerabilities.

13. A system, as set forth in claim 12, wherein the vulnerability correlation index generation unit further establishes each group of software application modules from vulnerabilities having a common recommended vulnerability remediation effort if the associated vulnerability correlation index is above a predetermined threshold.

14. A system, as set forth in claim 8, wherein the vulnerability identification unit identifies lines of code having the identified vulnerabilities, and wherein the identified lines of code are included in the prioritized list of remediation efforts.

15. One or more non-transitory computer-readable storage media, having computer-executable instructions embodied thereon, wherein when executed by at least one processor, the computer-executable instructions cause the processor to operate as:

a vulnerability identification unit coupled to a memory device and being configured to access a software application being stored in the memory device, the software application including a plurality of software application modules arranged in a predetermined flow structure, each software application module including predefined segments of code, to identify vulnerabilities within each predefined segments of code associated with the corresponding software application modules and to assign a severity to each identified vulnerability;

a vulnerability correlation index generation unit coupled to the memory device and the vulnerability identification unit and being configured to analyze the identified vulnerabilities and to assign a recommended vulnerability remediation effort to each identified vulnerability, to establish one or more groups of software application modules as a function of the assigned recommended vulnerability remediation effort and to generate a vulnerability correlation index (VCI) value associated with each group of software application modules including comparing the predefined segments of code of each software application module included in a corresponding group;

a code dependency index generation unit coupled to the memory device, the vulnerability identification unit, and the vulnerability correlation index unit and being configured to select each group of software application modules having a predefined VCI value and analyze each selected group of software application modules to identify a code dependency index including a point within the predetermined flow structure common to each software application within the same group of software application modules;

a code vulnerability index generating unit coupled to the memory device, the vulnerability identification unit, the vulnerability correlation index generation unit, and the code dependency index generation unit and being configured to establish a code vulnerability index associated with each group of software application modules as a function of the vulnerabilities, the vulnerability correlation index and the code dependency index; and, a prioritization list generation unit coupled to the memory device, the vulnerability identification unit, the vulnerability correlation index unit, and the code dependency index generation unit, the prioritization list generation unit configured to generate a prioritized list of remediation efforts aimed at mitigating the identified vulnerabilities, the prioritized list of remediation efforts including the identified vulnerabilities and the severity assigned to each identified vulnerability, the vulnerability correlation index associated with each group of vulnerabilities, and the corresponding code dependency indexes, the prioritization list generation unit further configured to store the prioritized list of remediation efforts within the memory device.

16. One or more non-transitory computer-readable storage media, having computer-executable instructions embodied thereon, as set forth in claim 15, wherein the severity of each identified vulnerability is one of low, medium, and high.

17. One or more non-transitory computer-readable storage media, having computer-executable instructions embodied thereon, as set forth in claim 15, wherein the groups of vulnerabilities are further established as a function of similar patterns in the software application modules, wherein the similar patterns may be one of an associated root cause and a remediation action.

18. One or more non-transitory computer-readable storage media, having computer-executable instructions embodied thereon, as set forth in claim 17, wherein the memory device includes a historical database of known vulnerabilities and known associated remedial actions, wherein the vulnerability correlation index generation unit assigns the recommended vulnerability remediation effort to each identified vulnerability as a function of the historical database of known vulnerabilities.

19. One or more non-transitory computer-readable storage media, having computer-executable instructions embodied thereon, as set forth in claim 18, wherein the vulnerability correlation index generation unit is further configured to compare the software application modules associated with the vulnerabilities in each group of vulnerabilities, wherein the vulnerability correlation index is established as a function of the comparison between the software application modules associated with the vulnerabilities in each respective group of vulnerabilities.

20. One or more non-transitory computer-readable storage media, having computer-executable instructions embodied thereon, as set forth in claim 19, wherein the vulnerability correlation index generation unit further establishes each group of software application modules from vulnerabilities having a common recommended vulnerability remediation effort if the associated vulnerability correlation index is above a predetermined threshold.

21. One or more non-transitory computer-readable storage media, having computer-executable instructions embodied thereon, as set forth in claim 15, wherein the computer-executable instructions cause the processor to operate as the vulnerability identification unit identifying lines of code having the identified vulnerabilities, and wherein the identified lines of code are included in the prioritized list of remediation efforts.

* * * * *